(12) United States Patent
Lin et al.

(10) Patent No.: US 9,146,704 B1
(45) Date of Patent: Sep. 29, 2015

(54) DOCUMENT FINGERPRINTING FOR MOBILE PHONES

(75) Inventors: Yuanhung Lin, San Jose, CA (US);
Liwei Ren, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 932 days.

(21) Appl. No.: 13/227,360

(22) Filed: Sep. 7, 2011

(51) Int. Cl.
*H04M 3/16* (2006.01)
*G06F 7/00* (2006.01)
*H04W 12/12* (2009.01)
*G06F 21/55* (2013.01)

(52) U.S. Cl.
CPC .............. *G06F 7/00* (2013.01); *G06F 21/552* (2013.01); *H04W 12/12* (2013.01)

(58) Field of Classification Search
CPC ..... G06F 21/552; G06F 21/645; G06Q 10/10; G06K 9/6201
USPC .............. 455/410, 411, 414.1, 418, 419, 550; 382/209, 112, 217, 218, 220; 707/694, 707/640, 740, 610, 747, 722, 688, 731, 707/802; 713/187, 188, 189, 190, 191, 194; 726/28, 29, 30
See application file for complete search history.

(56) References Cited

U.S. PATENT DOCUMENTS

| | | | |
|---|---|---|---|
| 6,493,709 B1 | 12/2002 | Aiken | |
| 6,584,470 B2 | 6/2003 | Veale | |
| 7,031,972 B2 | 4/2006 | Ren et al. | |
| 7,516,130 B2 | 4/2009 | Ren et al. | |
| 8,250,085 B1* | 8/2012 | Satish | 707/758 |
| 2003/0172066 A1 | 9/2003 | Cooper et al. | |
| 2004/0162786 A1 | 8/2004 | Cross et al. | |
| 2006/0253439 A1 | 11/2006 | Ren et al. | |
| 2008/0195606 A1 | 8/2008 | Ren et al. | |
| 2010/0254615 A1* | 10/2010 | Kantor et al. | 382/218 |

OTHER PUBLICATIONS

Muhammad Sharif, et al. "Multiple Values Search Algorithm" 2007—Spring 2008, pp. 49-58, vol. 1, No. 2, Journal of Information & Communication Technology.
Chakrabarti, et al. "Scalable feature selection, classification and signature generation for organizing large text databases into hierachical taxonomies", 1998, pp. 163-178, vol. 7, No. 3, VLDB Journal.
Anagnostopoulos, A. et al., "Sampling Search-Engine Results," Proceedings of the 14th International Conference on World Wide Web, WWW 2005, May 10-14, 2005, pp. 245-256, Chiba, Japan.
Chen. J., et al., "Knowledge Discovery and Data Mining Based on Power Plant Real-Time Database: A Survey", Oct. 8-12, 2001, pp. 1-5, Proceedings of International Conference on Power Engineering, Xi'an, China.
Chen, L., et al., "Template Detection for Large Scale Search Engines," Apr. 23-27, 2006, 5 pgs., SAC '06, Dijon, France.

(Continued)

*Primary Examiner* — Babar Sarwar
(74) *Attorney, Agent, or Firm* — Okamoto & Benedicto LLP

(57) ABSTRACT

One embodiment relates to a method for providing a service which matches document fingerprints against a database of document fingerprints. Target text data on a mobile phone device is obtained, and target document fingerprints are generated for the target text data using a fingerprint generator on the mobile phone device. The target document fingerprints are transmitted to a service cloud. A feedback message is received from the service cloud. The feedback message depends on results from matching the target document fingerprints against the database of document fingerprints. Other embodiments, aspects and features are also disclosed.

16 Claims, 10 Drawing Sheets

(56) References Cited

OTHER PUBLICATIONS

Hamilton. N., "The Mechanics of a Deep Net Metasearch Engine", 2003, 2 pgs., Proceedings of the 12th International World Wide Web Conference.

Jessop, M., et al., "Pattern Matching Against Distributed Datasets", 2004, 6 pgs. University of York, UK.

Lai, W.C., et al., "An Anatomy of a Large-Scale Image Search Engine", Dec. 2002, 4 pgs., IEEE MSE, Santa Barbara, CA.

Lavrenko, V., et al., "Relevance Models for Topic Detection and Tracking", 2002, 6 pgs., University of Massachusetts, MA.

Pallickara, S. et al., "Incorporating an XML Matching Engine in Distributed Brokering Systems", 2003, pp. 1-7, Proceedings of the International Conference on Parallel and Distributed Processing Techniques and Applications (PDPTA '03).

* cited by examiner

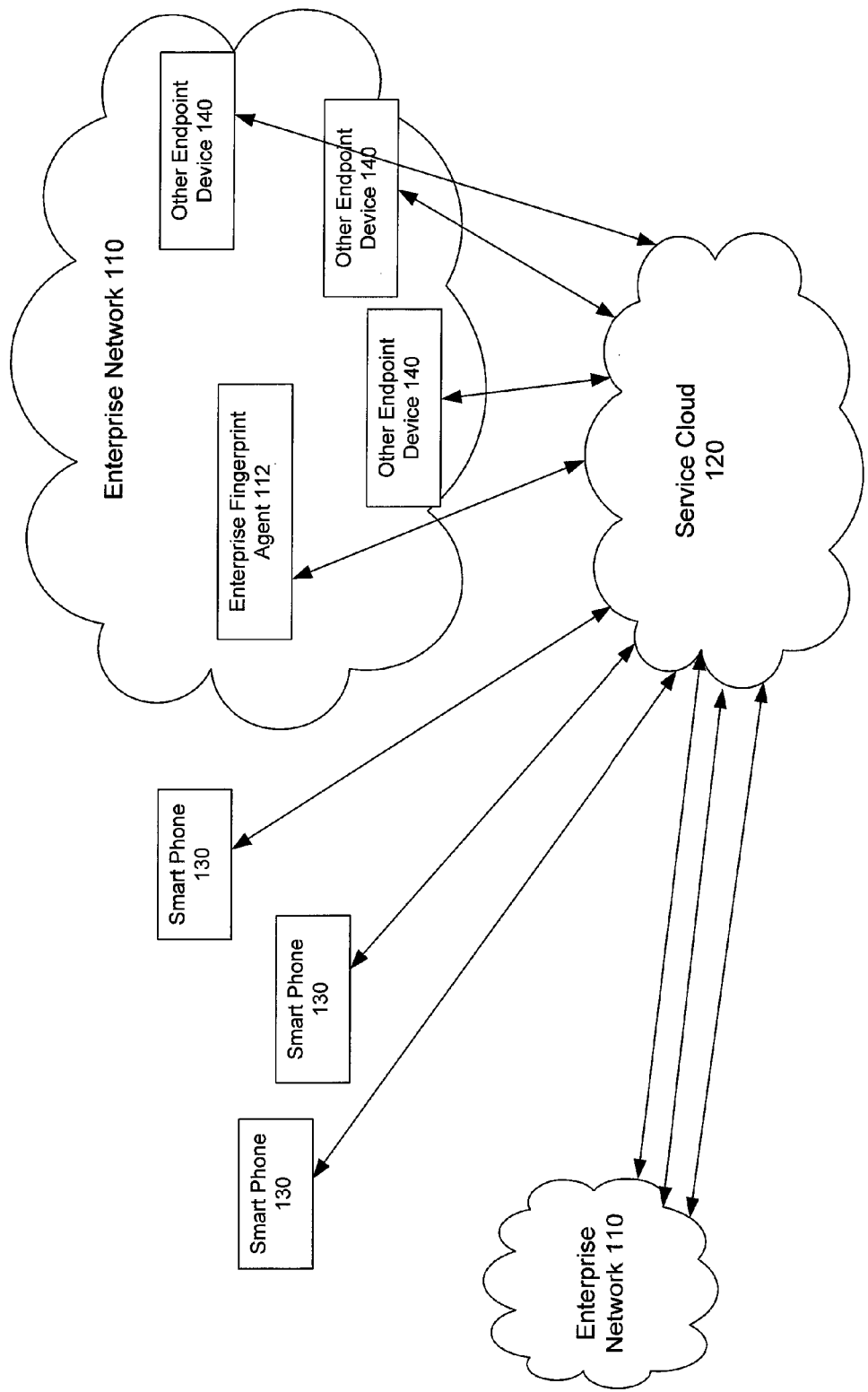
FIG. 1A    100

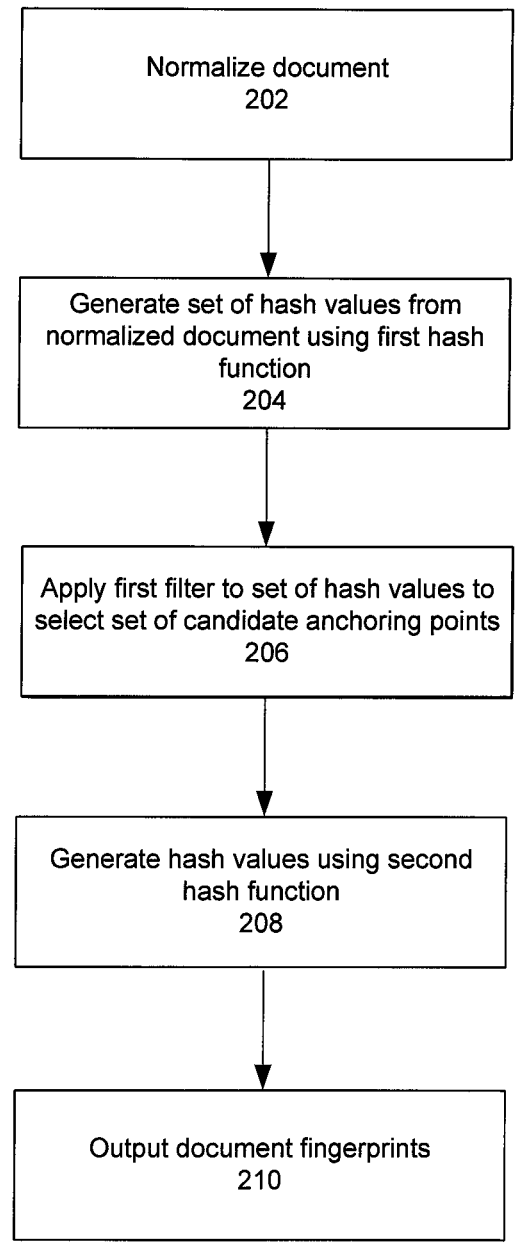
FIG. 2    200

FIG. 4    400

DOCUMENT FINGERPRINTING FOR MOBILE PHONES

BACKGROUND OF THE INVENTION

1. Field of the Invention

The present invention relates generally to methods and apparatus for document or text string fingerprinting. The technology disclosed herein is applicable for data leakage prevention, spam filtering, and other applications which may use document fingerprinting.

2. Description of the Background Art

One problem in the field of network security relates to data leakage prevention (DLP). DLP is needed to avoid loss of proprietary information, intellectual property, and other sensitive data. To protect sensitive data, enterprises need an effective DLP solution which monitors potential information leaks at the point of use. However, the explosion of messaging systems, wireless networking, and universal serial bus (USB) storage devices has made the protection of critical enterprise data difficult. As a result, enterprises are experiencing an increase in the loss and even theft of data assets by employees or contractors or even hackers (and malwares) who maliciously or accidentally leak data.

Another problem in the field of network security relates to unsolicited messages in e-mail systems. Such unsolicited messages, also referred to as "spam," are mass mailed by spammers to e-mail accounts over the Internet. Various anti-spam software products have been developed to combat spam.

It is highly desirable to improve technologies which facilitate document or text string fingerprinting for data leakage prevention, spam filtering, and other applications.

SUMMARY

One embodiment relates to a method for providing a service which matches document fingerprints against a database of document fingerprints. Target text data on a mobile phone device is obtained, and target document fingerprints are generated for the target text data using a fingerprint generator on the mobile phone device. The target document fingerprints are transmitted to a service cloud. A feedback message is received from the service cloud. The feedback message depends on results from matching the target document fingerprints against the database of document fingerprints.

Another embodiment relates to a mobile phone device which includes communication circuits configured to receive and send data by way of a cellular telecommunications network. The mobile phone device also includes a data storage system, including memory, configured to store computer-readable instruction code and data, and a processor configured to access the data storage system and to execute the computer-readable instruction code. Computer-readable instruction code in the mobile phone device is configured to generate target document fingerprints for target text data using a fingerprint generator, transmit the target document fingerprints to a service cloud, and receive a feedback message from the service cloud. The feedback message depends on results from matching the target document fingerprints against the database of document fingerprints.

Another embodiment relates to a computer apparatus including data storage configured to store computer-readable instruction code and data, and a processor configured to access the data storage and to execute said computer-readable instruction code. In addition, the computer apparatus includes computer-readable instruction code configured as an enterprise fingerprint agent for a cloud-based service. The computer apparatus further includes computer-readable instruction code configured to generate document fingerprints using a higher-density fingerprint generation procedure which comprises: normalizing target text data to create a normalized text string; applying a first hash function with a sliding hash window to the normalized text string to generate an array of hash values; applying a first filter to the array of hash values to select candidate anchoring points; and applying a second hash function to substrings located at the candidate anchoring points to generate the document fingerprints.

These and other embodiments and features of the present invention will be readily apparent to persons of ordinary skill in the art upon reading the entirety of this disclosure, which includes the accompanying drawings and claims.

BRIEF DESCRIPTION OF THE DRAWINGS

FIG. 1A is a high-level diagram of system for providing a data leakage prevention (DLP) service on smart phones in accordance with an embodiment of the invention.

FIG. 2 depicts a first method for generating document fingerprints in accordance with an embodiment of the invention.

DETAILED DESCRIPTION

DLP Service with Document Fingerprinting

Figure 1B:
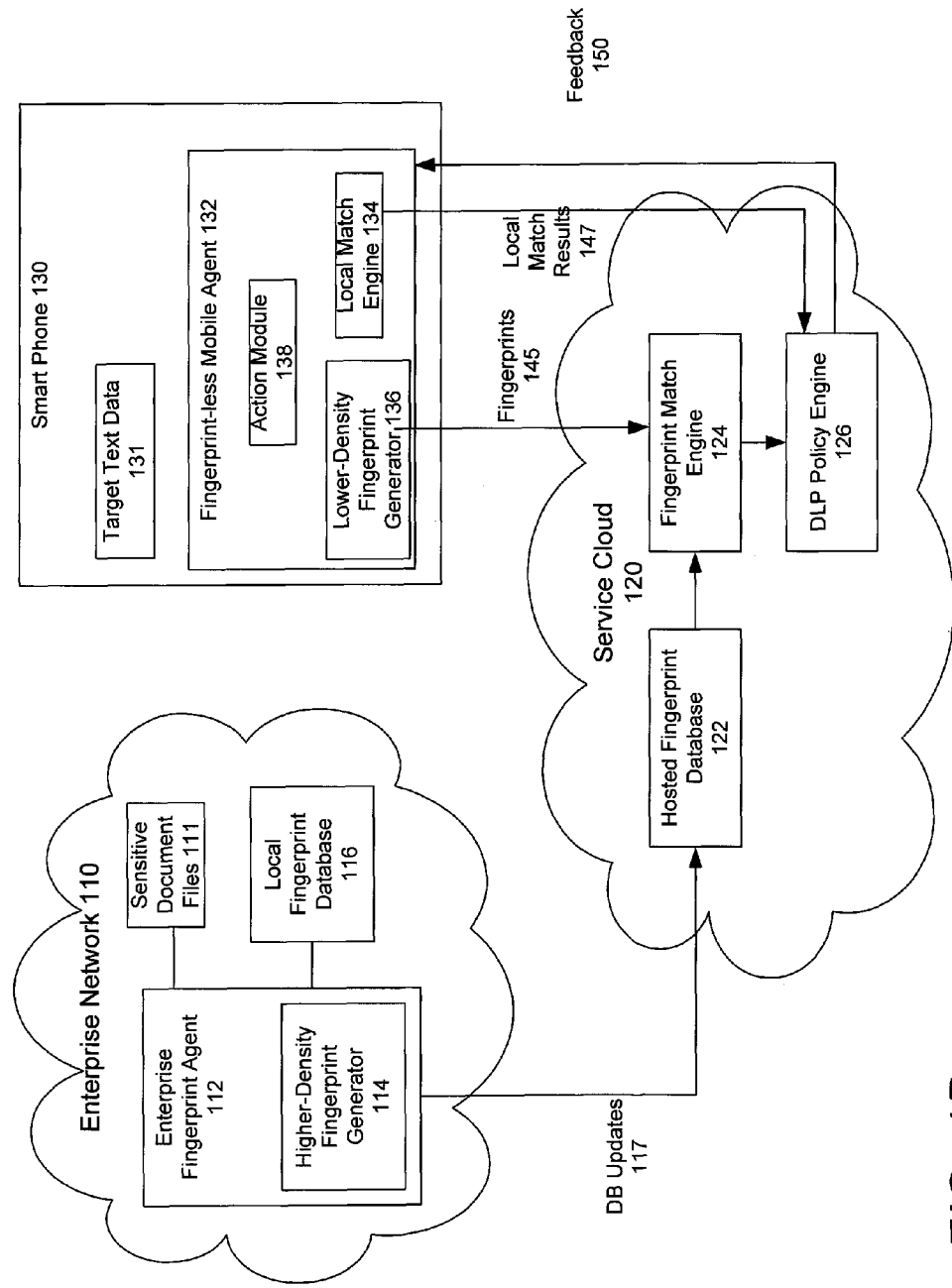
FIG. 1B shows select operational elements within the system of FIG. 1A in accordance with an embodiment of the invention.

With the popularity of smart phones, increasing number of business users are carrying sensitive business data in their smart phones that may or may not belong to their employers. This creates a serious channel for potential leakage of sensitive business data.

Unfortunately, conventional data leakage prevention (DLP) solutions do not work well with mobile phones. This is because conventional endpoint DLP agents require downloading document fingerprints for the enterprise from back-end servers. There are several difficulties due to this requirement.

First, the endpoints should be in the enterprise network for downloading fingerprints. In the case of mobile phones, this is not usually the case and is not a reasonable assumption. Second, the volume of fingerprints needing to be downloaded and stored on the mobile phone may be significantly large so as to consume an inordinate amount of bandwidth and storage space on the phone. Third, the process of matching fingerprints is generally substantially CPU intensive so as to consume a substantial portion of power on the phone. As such, due to these three difficulties, it is problematic to provide a DLP solution with fingerprint matching at mobile phones.

The present disclosure provides a DLP solution for mobile phones that overcomes the above-discussed difficulties. First, the solution provided by the present disclosure does not require the mobile phone to be a part of the enterprise network. Second, the solution provided by the present disclosure does not require the downloading and storage of fingerprints on the mobile phone. Third, the solution provided by the present disclosure does not require fingerprint matching to be performed by the mobile phone.

FIG. 1A is a high-level diagram of system 100 for providing a DLP service on smart phones in accordance with an embodiment of the invention. The system includes one or more enterprise networks 110, a service cloud 120, and a plurality of smart phones 130. An enterprise network 110 may be, for example, a wide area network for a large enterprise and may include various network segments. As further shown, an enterprise network 110 may include an enterprise fingerprint agent 112.

In relation to data leakage prevention for the enterprise network 110, various endpoint devices may be defined, including a plurality of smart phone devices 130 and a plurality of other endpoint devices 140. These endpoint devices are devices which are being monitored by the data leakage prevention system in order to prevent leakage of sensitive data.

The smart phone devices 130 may include smart phones and tablets which include telecommunications by way of a cellular phone network and Internet access. Various applications, such as a web browser, an electronic mail client, and other applications may be executed on the mobile operating system of the smart phone devices 130. For example, the mobile operating system may be the iOS mobile operating system available from Apple Inc. of Cupertino, Calif., or may include the Android software stack available from Google, Inc. of Mountain View, Calif., or may be a different mobile operating system. As shown in FIG. 1A, the smart phone devices 130 may be outside of the enterprise network 110. In other words, the smart phone devices 130 need not necessarily be nodes on the enterprise network 110.

The other endpoint devices 140 may include desktop, laptop computers, and other devices with data communication capabilities and/or removable data storage. As shown in FIG. 1A, the other endpoint devices 140 may be part of the enterprise network 110. In other words, the other endpoint devices 140 are typically nodes on a segment of the enterprise network 110.

The service cloud 120 may include various computing and network resources which may work together so as to provide an application service to the enterprise. In this case, the application service may be a DLP service. The DLP service may include DLP agents at endpoint devices to monitor outgoing communications and prevent leakage of sensitive (protected) information. In accordance with an embodiment of the invention, smart phone devices 130 may include a fingerprint-less mobile agent (FLMA) 132 to provide a bandwidth-efficient content-aware DLP solution for the smart phone devices 130. An embodiment of the FLMA 132 is described further below in relation to FIG. 1B.

FIG. 1B shows select operational elements within the system 100 of FIG. 1A in accordance with an embodiment of the invention. In particular, select operational elements utilized by the enterprise fingerprint agent (EFA) 112, the service cloud 120, and a smart phone 130 are shown.

Within the enterprise network 110, there is data file storage which may include sensitive document files 111 as determined by a DLP administrator for the enterprise. The sensitive document files 111 include sensitive text data, such as, for example, confidential personal information of employees, trade secret information of the enterprise, and other sensitive information.

The EFA 112 may be embodied as a program code executing on a computer system within the enterprise network 110. The EFA 112 may be configured to perform various functions, including classifying sensitive documents, generating fingerprints based on text data in the sensitive documents 111, and uploading the fingerprints to the service cloud 120.

In accordance with an embodiment of the invention, the fingerprints may be generated by the EFA 112 using a higher-density fingerprint generator 114. In one implementation, the higher-density fingerprint generator 114 may be configured to utilize a single-stage fingerprint filtering technique which is described in further detail below. The sensitive document fingerprints for the enterprise may be stored in a local fingerprint database 116.

Within the service cloud 120, there may be a hosted fingerprint database 122. The hosted fingerprint database 122 may be a copy of the local fingerprint database 116 and may be hosted on one or more data storage devices within the service cloud 120. The hosted fingerprint database 122 may be frequently updated with database updates 117 to keep the local and hosted databases closely synchronized. Fingerprint database updates may be transmitted from the enterprise fingerprint agent 112 in the enterprise network 110 to the service cloud 120.

The service cloud 120 may also include a fingerprint match engine 124 and a data leakage prevention policy engine (DLP policy engine) 126. The fingerprint match engine 124 and the DLP policy engine 126 may each be embodied as program code executing on one or more server computers within the service cloud 120.

The fingerprint match engine 124 may be configured to receive fingerprints 145 of the target text data 131 from the smart phone 130 (or other endpoint devices 140). The fingerprint match engine 124 applies a matching method to determine to what degree the fingerprints 145 of the target text data 131 match, or do not match, one or more fingerprint in the hosted fingerprint database 122. The results of the matching may be communicated to the DLP policy engine 126.

The DLP policy engine 126 may be configured to receive local match results 147 from the local match engine 134 on the smart phone 130 (or other endpoint device 140). The DLP policy engine 126 may then apply policies, which may be specific to a particular enterprise, to the match results. In other words, different enterprises may have different policies to be applied by the DLP policy engine 126. Feedback 150 based on the match results and applied policies may then be returned from the service cloud 120 to the smart phone 130 (or other endpoint device 140) which had sent the local match results 147.

The service cloud 120 may provide a web-based console that an enterprise DLP administrator may use to manage the DLP service by creating the DLP policies, compliance templates, digital assets such as keyword dictionaries and regular expression patterns, and so forth. The enterprise DLP administrator may also use such a web-based console to manage the hosted fingerprint database for the enterprise and to generate DLP reports.

In accordance with an embodiment of the invention, the DLP policy engine 126 is configured to receive results from the fingerprint match engine 124 regarding whether or not the fingerprints received from a smart phone 130 (or other endpoint device 140) match one or more fingerprint in the hosted fingerprint database 122. The DLP policy engine 126 may then apply policies, which may be specific to a particular enterprise, to the results. Feedback 150, based on the match results and the applied policies, is then returned to the smart phone 130 (or other endpoint device 140) which had sent the fingerprints 145 to be matched.

The smart phone device 130 (or other endpoint device 140) may include target text data 131 and the FLMA 132. The target text data 131 may be, for example, in a document file that is being exported from the device. For example, the target text data 131 may be in a file attached to an outgoing electronic mail or text message, or the target text data may be in the body of the outgoing electronic mail or text message. Since the device is an endpoint of the DLP system, such an exportation of text data is monitored by the DLP system and may be checked by fingerprint matching against the hosted fingerprint database 122 used by the service cloud 120.

The FLMA 132 may include program code configured to implement a local match engine 134 and a fingerprint generator. The local match engine 134 may be configured to match non-fingerprint-related attributes such as, keywords, regex patterns, and file attributes. The matching techniques utilized by the local match engine 134 may be less CPU intensive than fingerprint matching. The local match result may be compressed and sent to the DLP policy engine 126 in the service cloud 120. The fingerprint generator is configured to generate digital "fingerprint" data ("document fingerprints" or simply "fingerprints") of the target text data 131. In addition, the FLMA 132 may include an action module 138 which is configured to take actions such as providing an alert or blocking the data leak. The alert may comprise, for example, a short text message that may be sent to the phone user as a warning. The data leak blocking may comprise, for example, a command to block an outgoing message from the phone.

In accordance with an embodiment of the invention, the fingerprint generator of the FLMA 132 may comprise a lower-density fingerprint generator 136. In implementation, the lower-density fingerprint generator 136 may be configured to utilize a multiple-stage (two or more stages) fingerprint filtering technique which is described in further detail below. Due to the extra fingerprint filtering, the lower-density fingerprint generator 136 of the smart phone 130 generates substantially fewer fingerprints for the same text data than the number generated by the higher-density fingerprint generator 114 of the EFA 112. The fingerprints per document may be very small in total size. For example, the size of the fingerprints per document may be sixty-four bytes per document and may include eight fingerprints of eight bytes each.

By generating fewer fingerprints 145, the lower-density fingerprint generator 130 utilizes less telecommunications bandwidth when it sends the fingerprints 145 from the smart phone 130 to the service cloud 120. This feature is particularly advantageous due to the limited bandwidth available for cell phone data communications. The smaller bandwidth requirements due to the fewer fingerprints means that the cloud-based DLP service (or other service using document fingerprint matching) may be provided with less impact on cell phone performance.

In accordance with an embodiment of the invention, document fingerprinting is provided for mobile phones using an asymmetric fingerprint generation system. In this case, the fingerprint generation is asymmetric in that a higher-density fingerprint generator is used on the enterprise side for sensitive document fingerprinting, and a lower-density fingerprint generator is used on the mobile device side for document variation detection. More particularly, in a specific implementation, single-stage fingerprint filtering may be used for the higher-density fingerprint generation, and multiple-stage fingerprint filtering may be used for the lower-density fingerprint generation.

Document fingerprints are document attributes used to characterize some invariants of a document. Document fingerprints should ideally have the following characteristics: i) unrelated and irrelevant documents should not share any fingerprint; and ii) a variant of a document is expected to have some common fingerprints with its original version.

The present disclosure provides a DLP solution with document fingerprinting that is sufficiently resource-efficient to be practical for use with a smart phone device. The disclosed DLP solution is advantageously content-aware in that variants of a sensitive document may be detected with minimal false positives by utilizing document fingerprinting technology. The solution is advantageously storage efficient at the smart phone in that no fingerprint database needs to be stored on the smart phone. In addition, the solution is advantageously processing and power efficient at the smart phone in that the fingerprint matching (which may be processing-intensive and power-consuming) is not performed by the smart phone. Furthermore, the solution is advantageously "bandwidth efficient" because the lower-density fingerprint generator may generate a small amount of fingerprint data (for example, less than one hundred bytes) to send to the service cloud for the matching service.

Higher-Density Fingerprint Generation

FIG. 2 depicts a first method 200 for generating document fingerprints in accordance with an embodiment of the invention. This first method 200 may be applied by the higher-density fingerprint generator 114 used by an EFA 112.

As shown in FIG. 1B, sensitive document files 111 may be stored in a data storage system in the enterprise network 110. Consider the generation of fingerprints for one file d which is deemed to include sensitive information to be protected by the DLP system.

Per the method 200 of FIG. 2, computer-readable program code may be configured to receive and normalize 202 the document d to generate a normalized document t. The document may be normalized 202 by a process that may include the following three sub-processes: i) converting a document in any format, such as Word, Excel, PPT, PDF and so forth, into a plain text encoded in UTF-8; ii) translating any plain text in other encodings into the plain text encoded in UTF-8; and iii) removing the non-informative characters such as white spaces, control characters, delimiters and so forth. The normalized document t may be a textual string encoded in UTF-8 after the document is normalized. A normalized document may be viewed as either a UTF-8 string or a binary string. In this disclosure, we generally view a normalized document as a binary string.

Figure 3:
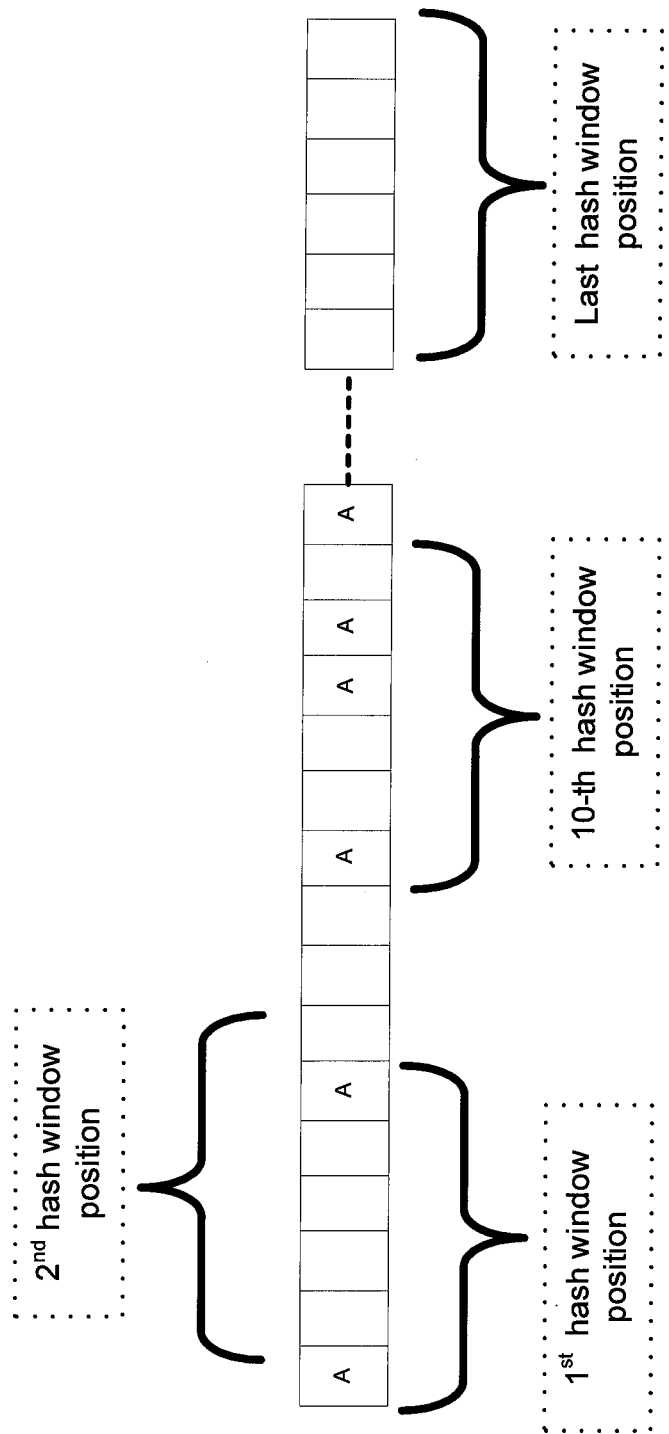
FIG. 3 illustrates a sliding hash window and anchoring points after application of a first filter in accordance with an embodiment of the invention.

The normalized document t is then processed to generate 204 a set of hash values h from t. In accordance with one embodiment of the invention, a rolling hash function, denoted H1, with a pre-defined hash window size may be used to slide through and process the normalized text string t in order to generate the set of hash values. An example of such a sliding hash window is shown in FIG. 3. In FIG. 3, each block in the depicted array represents a character of the normalized text string t. The rolling hash function H1 may generate one hash value h from each position of the sliding hash window. For example, if the text string is n characters long, and the hash window is w characters wide, then (n−w+1) hash values h may be generated. In a particular implementation, the rolling hash function H1 may be a Karp-Rabin function.

In accordance with an embodiment of the invention, a first filter may be applied 206 to the set of hash values h. For example, in one implementation, the first filter may select those hash values h which satisfy h=0 mod p, where p is a pre-defined prime number. The hash values selected by the first filter form a set of candidate anchoring points. Example candidate anchoring points are designated in FIG. 3 by the letter A in the array.

In accordance with the method 200 shown in FIG. 2, the document fingerprints may then be generated 208 based on the entire set of candidate anchoring points. In other words, the entire set of candidate anchoring points is selected or kept as anchoring points such that a higher-density of fingerprints may be generated in this method 200.

For each anchoring point, a second hash function H2 may be used to generate a hash value from the substring starting at that anchoring point. The size of the substring may be the same as the sliding hash window. The second hash function H2 is preferably a different hash function from the first hash function H1. Using two different hash functions advantageously reduces false positive caused by hash collisions. The set of hash values generated by the second hash function H2 may be output 210 as the document fingerprints for the document d.

Lower-Density Fingerprint Generation

Figure 4:
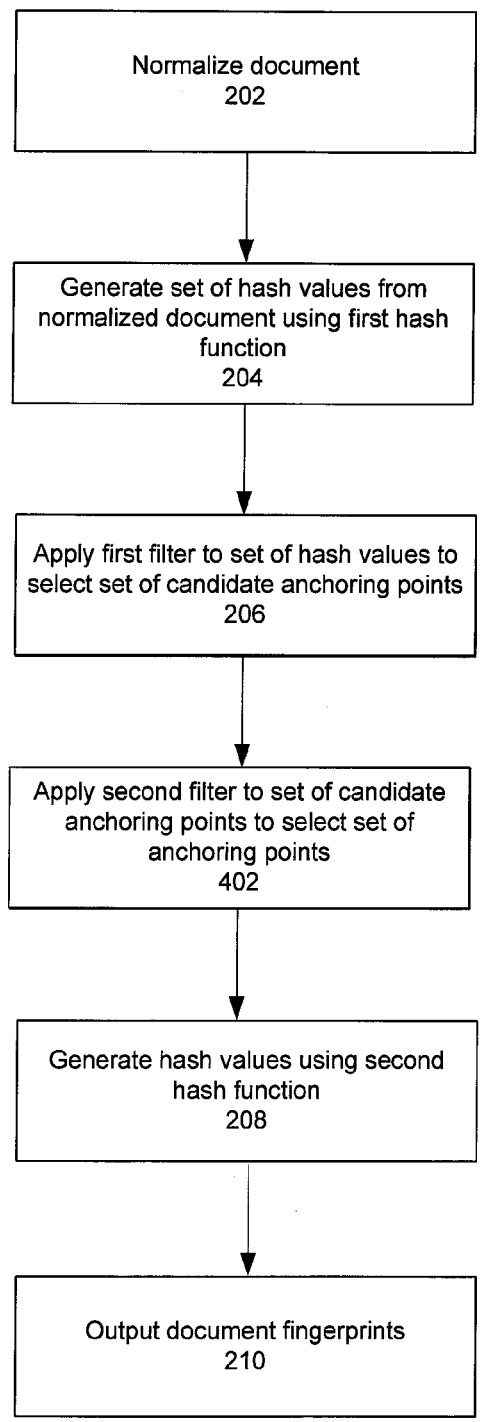
FIG. 4 depicts a second method for generating document fingerprints in accordance with an embodiment of the invention.

FIG. 4 depicts a second method 400 for generating document fingerprints in accordance with an embodiment of the invention. This second method 400 may be applied by the lower-density fingerprint generator 136 used by an FLMA 132.

Like the first method 200 of FIG. 2, the second method 400 of FIG. 4 may also normalize 202 the document, generate 204 a set of hash values from the normalized document using a first hash function, and apply 206 a first filter to the set of hash values to select a set of candidate anchoring points.

Figure 5:
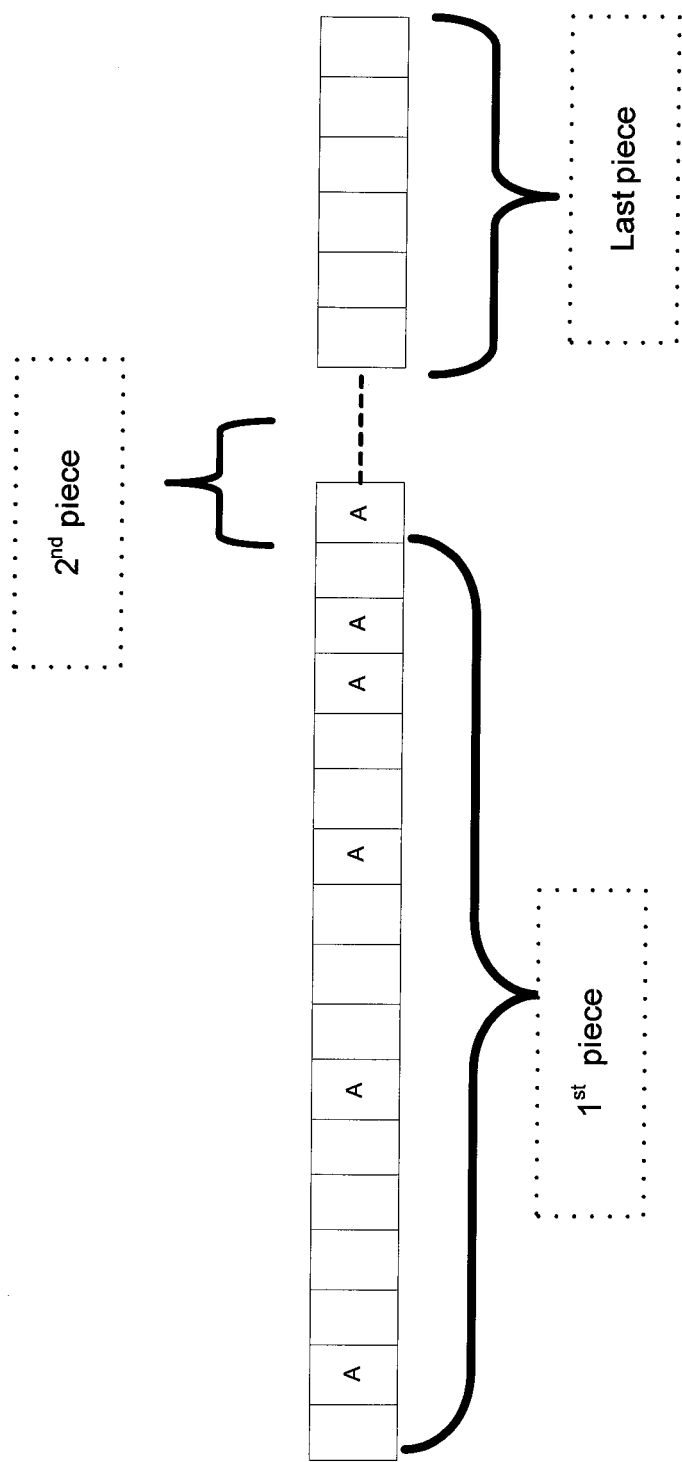
FIG. 5 depicts the division of a normalized textual string into a number of pieces for a second filtering method in accordance with an embodiment of the invention.

Unlike the first method 200, the second method 400 applies 402 a second filter to the set of candidate anchoring points so as to select a set of anchoring points. The set of anchoring points is a subset of the set of candidate anchoring points. In accordance with one embodiment of the invention, applying 402 the second filter may involve dividing the normalized text string in binary form into a plurality of N pieces, and selecting only one of the candidate anchoring points per piece. In an exemplary embodiment, the N pieces may be of equal binary size, except that last piece (whose size depends on the remaining length of the string for that last piece). FIG. 5 depicts the division of a normalized textual string into a number of pieces in accordance with an embodiment of the invention.

Figure 6:
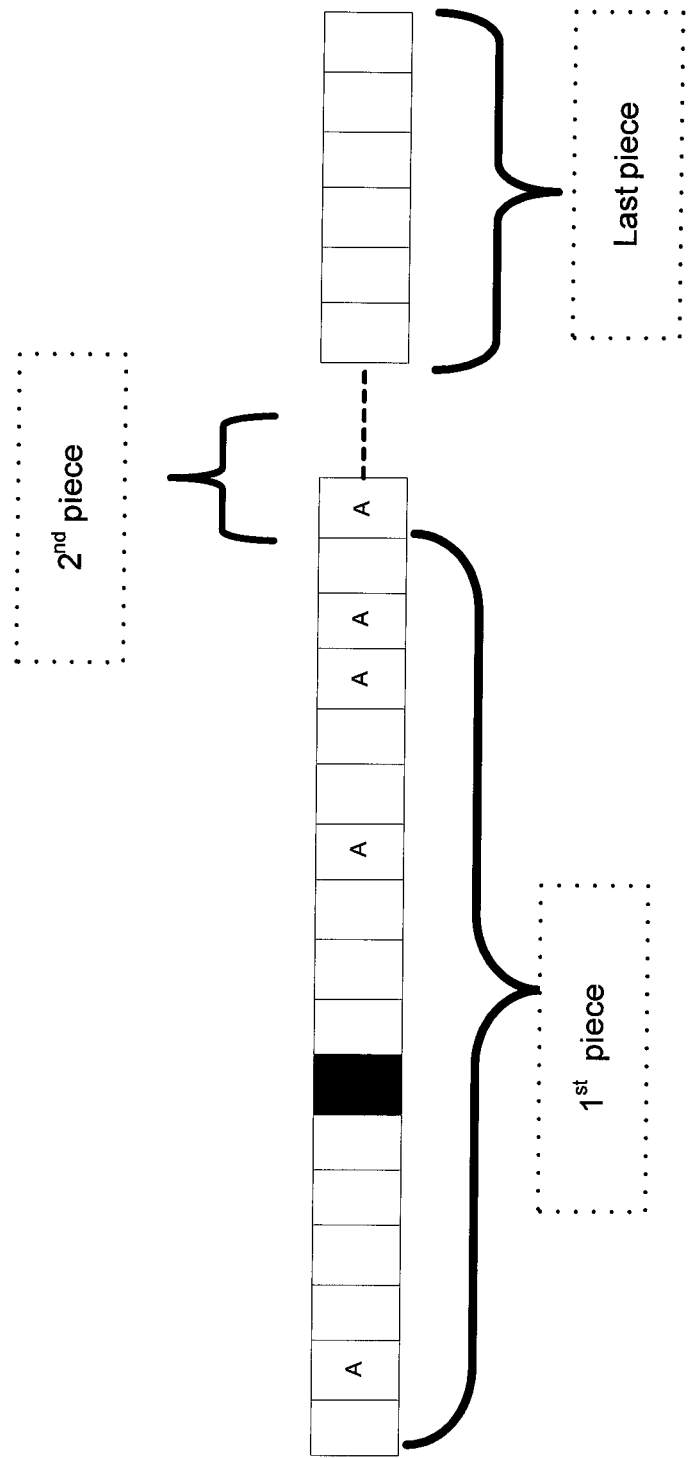
FIG. 6 shows the selection of a single anchoring point from a first piece for the second filtering method in accordance with an embodiment of the invention.

For any piece, if the piece contains multiple candidate anchoring points (previously selected by the application 204 of the first filter), then the candidate anchoring point closest to the centre of the piece is selected to be the anchoring point for that piece. FIG. 6 shows the selection of a single anchoring point (the rectangle filled in black) from a first piece in accordance with an embodiment of the invention.

Like in the first method 200, for each anchoring point, a second hash function H2 may be used to generate a hash value from the substring starting at that anchoring point. The size of the substring may be the same as the sliding hash window. The second hash function H2 is preferably a different hash function from the first hash function H1 so as to advantageously reduce false positive caused by hash collisions. The set of hash values generated by the second hash function H2 may be output 210 as the document fingerprints for the document d.

Example Computer Apparatus and Mobile Device

Figure 7:
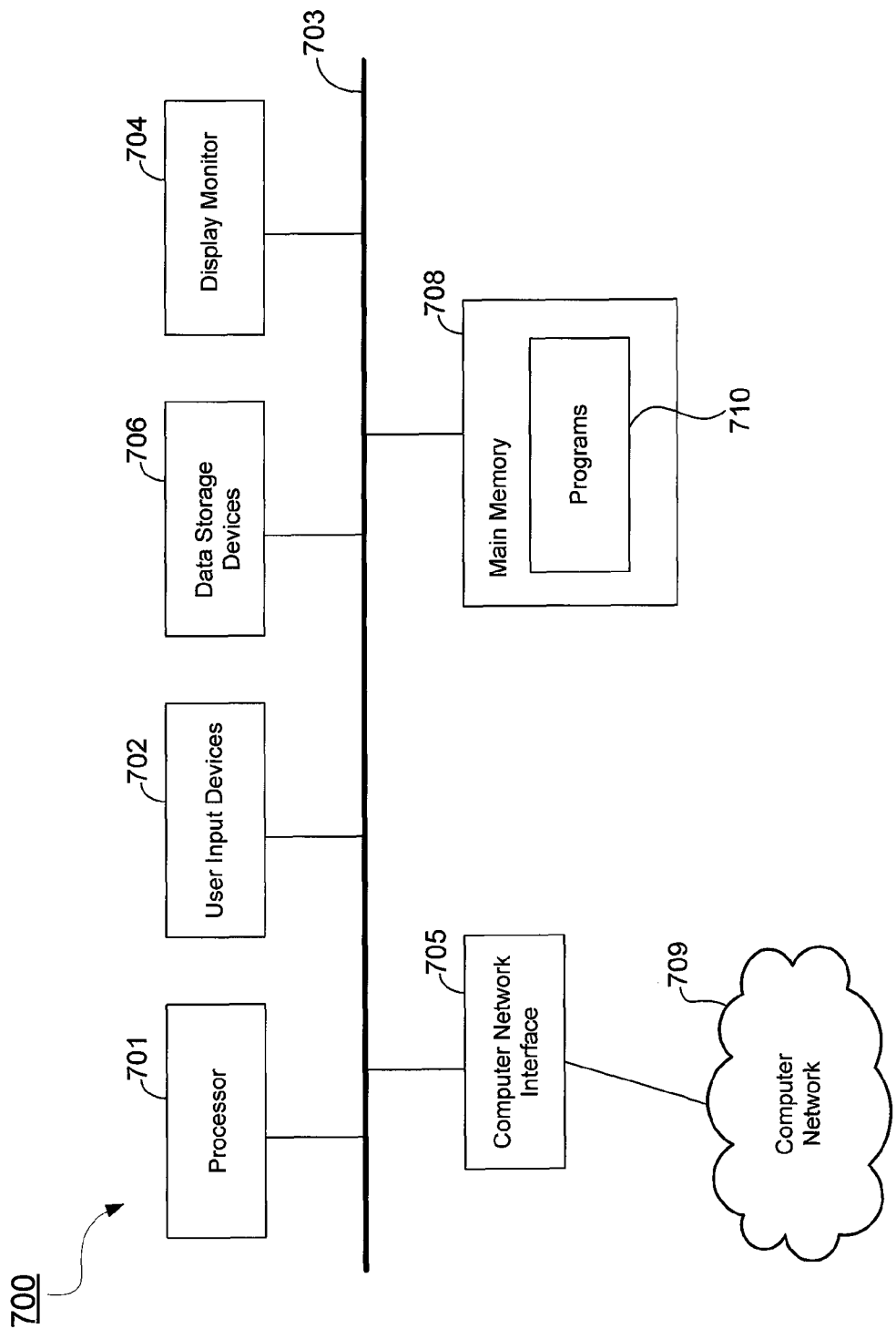
FIG. 7 depicts select components of an example computer that may be used in embodiments of the present invention.

Referring to FIG. 7, there is shown a schematic diagram of an example computer apparatus 700 that may be used in embodiments of the present invention. For example, one or more computer apparatus 700 may be utilized in the enterprise network 110 to execute computer-readable program code configured to implement the enterprise fingerprint agent 112. In addition, one or more computer apparatus 700 may be utilized in the service cloud 120 to execute computer-readable program code configured to implement the fingerprint match engine 124 and the DLP policy engine 126.

As shown in the figure, the computer may include a processor 701, such as those from the Intel Corporation or Advanced Micro Devices, for example. The computer may have one or more buses 703 coupling its various components. The computer may include one or more input devices 702 (e.g., keyboard, mouse, etc.), a display monitor 704 (e.g., LCD, cathode ray tube, flat panel display, etc.), a computer network or communications interface 705 (e.g., network adapters, wireless network adapters, etc.) for communicating over a computer (data) network 709, one or more data storage devices 706 (e.g., hard disk drive, optical drive, FLASH memory, etc.) for storing computer-readable data onto computer-readable media and for reading the data therefrom, and a main memory 708 (e.g., DRAM, SRAM, etc.).

Computer-readable data (including computer-readable program instructions) may be stored in the data storage devices 706 and may be loaded into main memory 708. Computer-readable data may also be received over the computer network 709 by way of a communications interface 705. In particular, the main memory 708 may loaded with programs 710 (comprising computer-readable instruction code and data) which may be executed by the processor 701 to perform some of the functionalities and operations as described herein.

Figure 8:
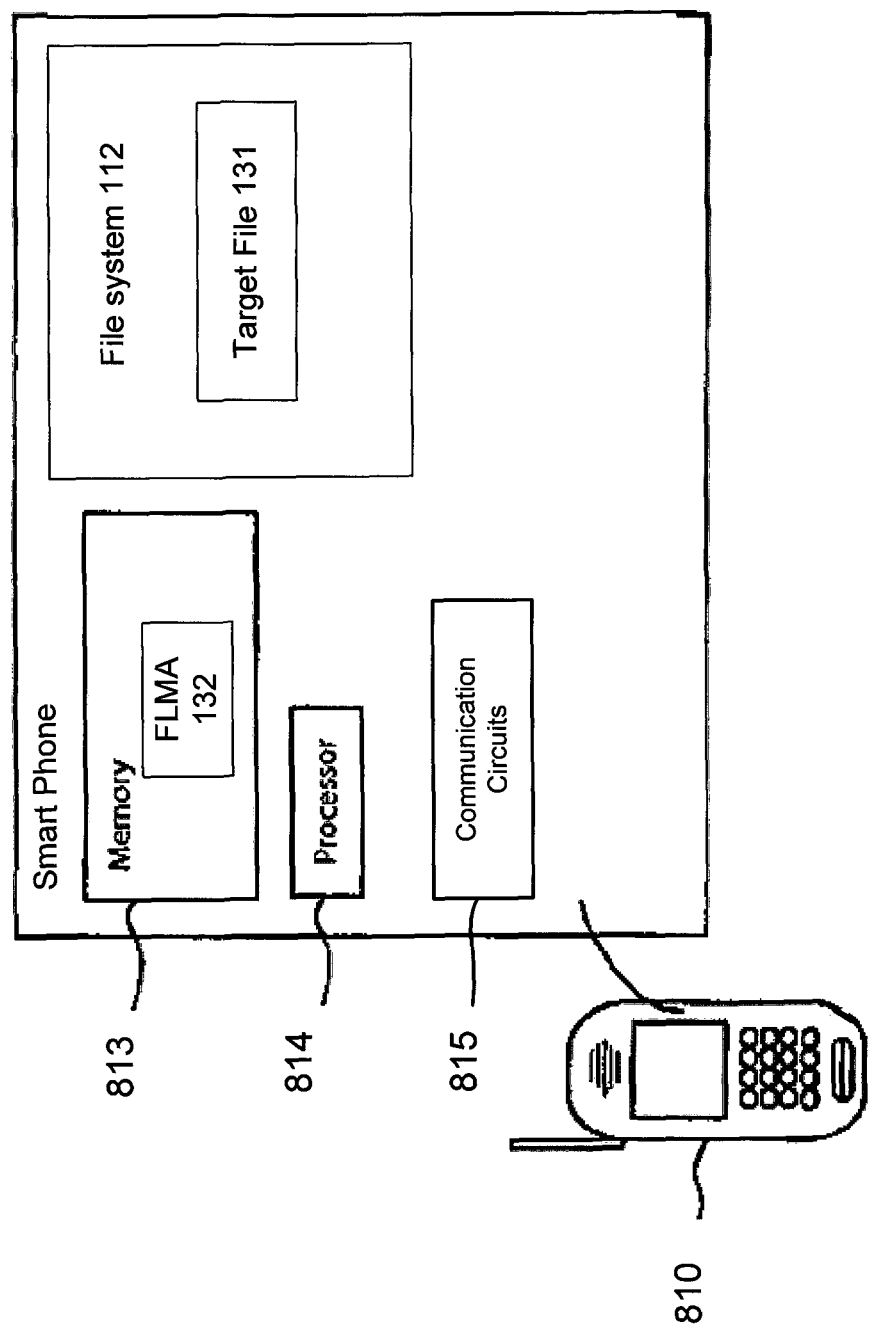
FIG. 8 depicts select components of an example mobile device that may be used in embodiments of the present invention.

Referring to FIG. 8, there is shown a schematic diagram of an example smart phone device 810 that may be used in embodiments of the present invention. For example, the smart phone 810 may be utilized to execute computer-readable program code configured to implement the fingerprint-less mobile agent 132.

As shown in the figure, the smart phone 810 may include memory 813 for storing data, at least one processor 814 for executing computer-readable code, and communication circuits 815. The communication circuits 815 may be configured for wireless data communications via a cellular phone network. The memory 813 may hold the FLMA 132, and the processor 814 may execute the FLMA 132. The smart phone 810 may also include a file system 112 which may include the target text data 131 which may be checked for sensitive data by the FLMA 132.

Spam Filtering Service with Document Fingerprinting

Figure 9:
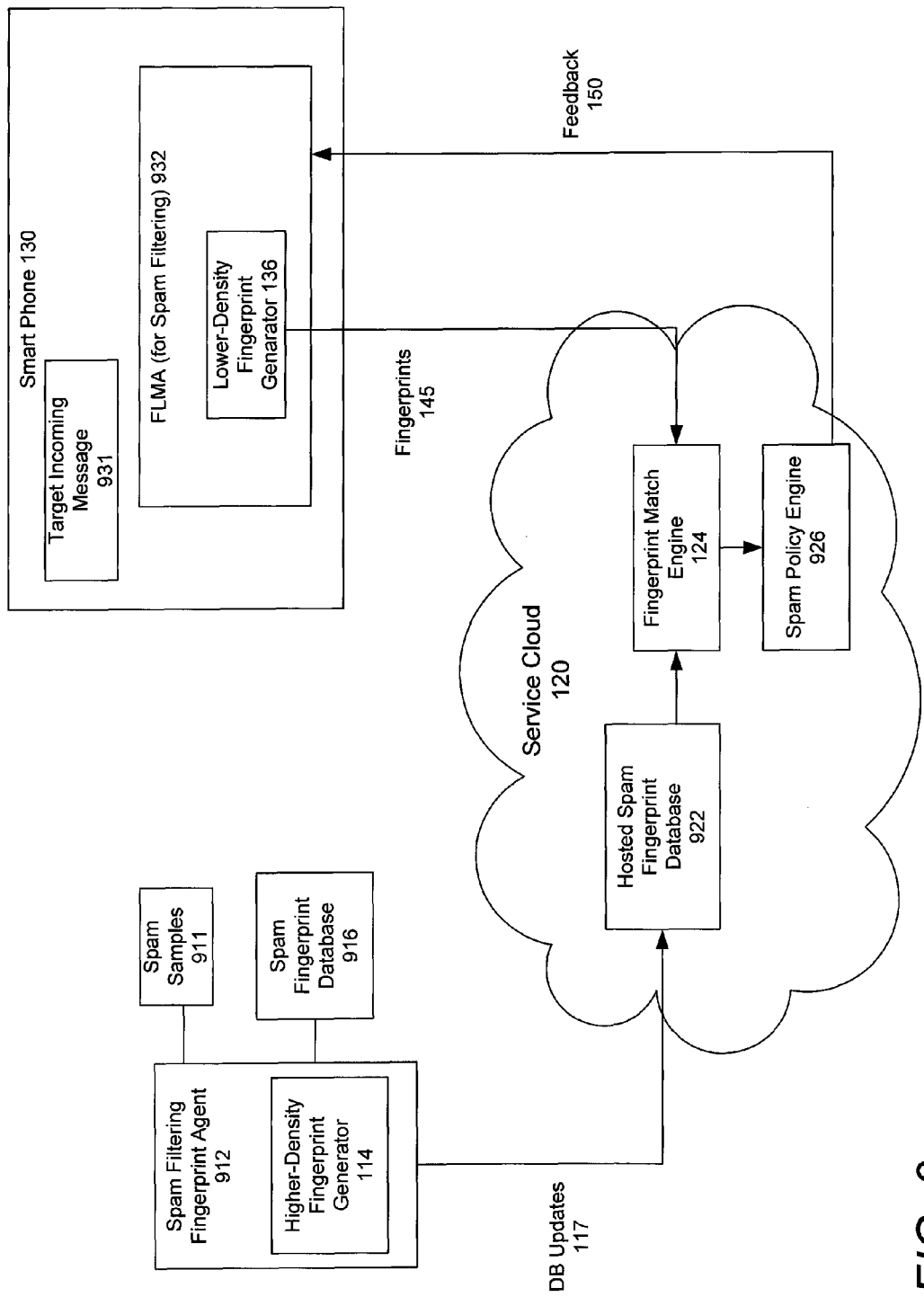
FIG. 9 depicts select operational elements of a system for providing a spam filtering service on smart phones in accordance with an embodiment of the invention.

FIG. 9 depicts select operational elements of a system for providing a spam filtering service on smart phones in accordance with an embodiment of the invention. The elements for providing the spam filtering service for smart phones per FIG. 9 are similar to the elements for providing the data leakage prevention service for smart phones per FIG. 1B.

In the system of FIG. 9, a spam filtering agent 912 generates document fingerprints of spam samples 911 using a higher-density fingerprint generator 114. These fingerprints may be stored and indexed on a local fingerprint database 116. The service cloud 120 may receive database updates 117 so as to keep the hosted fingerprint database 122 in relatively close synchronization with the local fingerprint database 116.

The smart phone 130 may include a target incoming message 931 which may be filtered for spam by the FLMA (for spam filtering) 932. The FLMA 932 may use the lower-density fingerprint generator 136 to generate fingerprints from the target incoming message 931. These fingerprints 145 may be sent to the fingerprint match engine 124 of the service cloud 120 for matching against the hosted spam fingerprint database 922.

Results of the matching may be provided to the spam policy engine 926. The spam policy engine 926 may apply policies to determine the feedback 150 to return based on the matching results. The policies implemented by the spam policy engine 926 may be customized for an organization or for a particular user. Based on the feedback 150, the smart phone may perform actions, such as blocking the message and/or alerting the user of the smart phone or an administrator of an organization.

While specific embodiments of the present invention have been provided, it is to be understood that these embodiments are for illustration purposes and not limiting. Many additional embodiments will be apparent to persons of ordinary skill in the art reading this disclosure.

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Components may be implemented separately in multiple modules or together in a single module.

What is claimed is:

1. A method for providing a service which matches document fingerprints against a database of document fingerprints, the method comprising:
   obtaining target text data on a mobile phone device;
   generating target document fingerprints for the target text data using a fingerprint generator on the mobile phone device;
   transmitting the target document fingerprints from the mobile phone device to a service cloud; and
   receiving a feedback message by the mobile phone device from the service cloud, wherein the feedback message depends on results from matching the target document fingerprints against the database of document fingerprints,
   wherein the fingerprint generator on the mobile phone device comprises a lower-density fingerprint generator, and wherein indexed document fingerprints in the database of document fingerprints are generated by a higher-density fingerprint generator.

2. The method of claim 1, wherein the target text data is obtained from an outgoing data communication from the mobile phone device.

3. The method of claim 2, wherein the service cloud is configured to provide a data leakage prevention service to an enterprise network, and wherein the mobile phone device is outside of the enterprise network.

4. The method of claim 1, wherein the target text data is obtained from an incoming data communication that has arrived at the mobile phone device.

5. The method of claim 4, wherein the service cloud is configured to provide a spam filtering service.

6. The method of claim 1, wherein the lower-density fingerprint generator generates the target document fingerprints by a multiple-filtering procedure, and wherein the higher-density fingerprint generator generates document fingerprints using a single-filtering procedure.

7. The method of claim 1, wherein the lower-density fingerprint generator generates the target document fingerprints by a procedure comprising:
   normalizing target text data to create a normalized text string;
   applying a first hash function with a sliding hash window to the normalized text string to generate an array of hash values;
   applying a first filter to the array of hash values to select candidate anchoring points;
   applying a second filter to the candidate anchoring points to select anchoring points; and
   applying a second hash function to substrings located at the selected anchoring points to generate the target document fingerprints.

8. The method of claim 1, wherein the higher-density fingerprint generator generates the document fingerprints by a procedure comprising:
   normalizing target text data to create a normalized text string;
   applying a first hash function with a sliding hash window to the normalized text string to generate an array of hash values;
   applying a first filter to the array of hash values to select candidate anchoring points; and
   applying a second hash function to substrings located at the candidate anchoring points to generate the document fingerprints.

9. A mobile phone device comprising:
   communication circuits configured to receive and send data by way of a cellular telecommunications network;
   a data storage system, including memory, configured to store computer-readable instruction code and data;
   a processor configured to access the data storage system and to execute the computer-readable instruction code;
   the data storage system storing therein computer-readable instruction code configured to provide a fingerprint generator on the mobile phone, computer-readable instruction code configured to obtain target text data from the data storage system on the mobile phone device, computer-readable instruction code configured to generate target document fingerprints for the target text data using the fingerprint generator, computer-readable instruction code configured to transmit the target document fingerprints to a service cloud, and computer-readable instruction code configured to receive a feedback message from the service cloud, wherein the feedback message depends on results from matching the target document fingerprints against the database of document fingerprints, wherein the target text data is obtained from an outgoing data communication from the mobile phone device, wherein the service cloud is configured to provide a data leakage prevention service to an enterprise network, and wherein the mobile phone device further comprises a fingerprint-less mobile agent for the data leakage prevention service.

10. The mobile phone device of claim 9, wherein the target text data is obtained from an incoming data communication that has arrived at the mobile phone device.

11. The mobile phone device of claim 10, wherein the service cloud is configured to provide a spam filtering service, and wherein the mobile phone device further comprises a fingerprint-less mobile agent for the spam filtering service.

12. The mobile phone device of claim 9, wherein the fingerprint generator is programmed to generate the target document fingerprints using a multiple-filtering procedure.

13. The mobile phone device of claim 9, wherein the fingerprint generator is programmed to generate the target document fingerprints by a procedure comprising:
   normalizing target text data to create a normalized text string;
   applying a first hash function with a sliding hash window to the normalized text string to generate an array of hash values;
   applying a first filter to the array of hash values to select candidate anchoring points;
   applying a second filter to the candidate anchoring points to select anchoring points; and
   applying a second hash function to substrings located at the selected anchoring points to generate the target document fingerprints.

14. A computer apparatus comprising:
   data storage device configured to store computer-readable instruction code and data;
   a processor configured to access the data storage device and to execute said computer-readable instruction code;
   computer-readable instruction code configured as an enterprise fingerprint agent for a cloud-based service;
   the data storage device storing therein computer-readable instruction code configured to generate document fingerprints using a higher-density fingerprint generation procedure which comprises:
   normalizing target text data to create a normalized text string;
   applying a first hash function with a sliding hash window to the normalized text string to generate an array of hash values;
   applying a first filter to the array of hash values to select candidate anchoring points; and
   applying a second hash function to substrings located at the candidate anchoring points to generate the document fingerprints.

15. The computer apparatus of claim 14, wherein the cloud-based service comprises a data leakage prevention service.

16. The computer apparatus of claim 14, wherein the cloud-based service comprises a spam filtering service.

* * * * *